Dec. 1, 1953 — A. LORENZ — 2,661,048
RECLINING ARTICLE OF FURNITURE
Filed Jan. 31, 1946 — 6 Sheets-Sheet 1

INVENTOR
ANTON LORENZ
BY
HIS ATTORNEY

Dec. 1, 1953  A. LORENZ  2,661,048
RECLINING ARTICLE OF FURNITURE
Filed Jan. 31, 1946  6 Sheets-Sheet 2

INVENTOR
ANTON LORENZ
BY
HIS ATTORNEY

Dec. 1, 1953 A. LORENZ 2,661,048
RECLINING ARTICLE OF FURNITURE
Filed Jan. 31, 1946 6 Sheets-Sheet 3
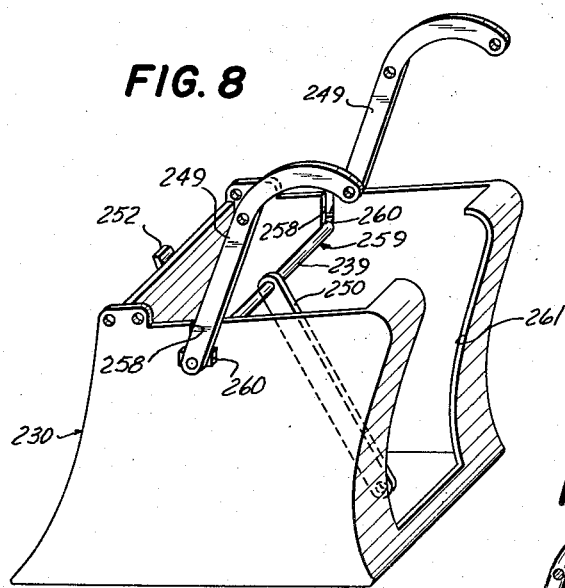
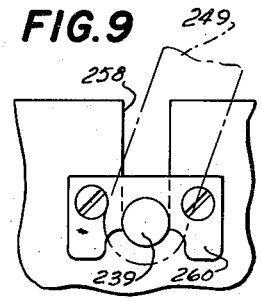
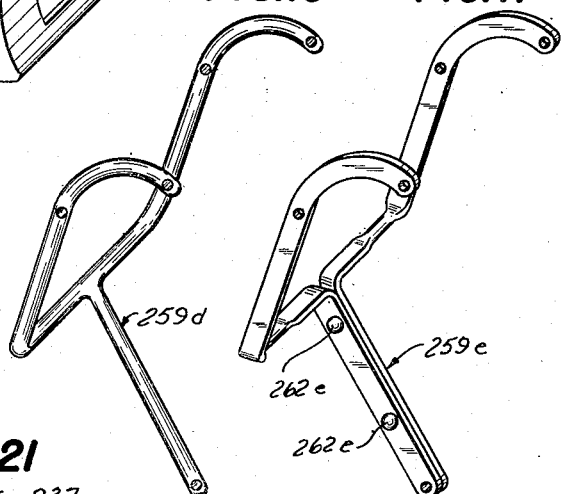
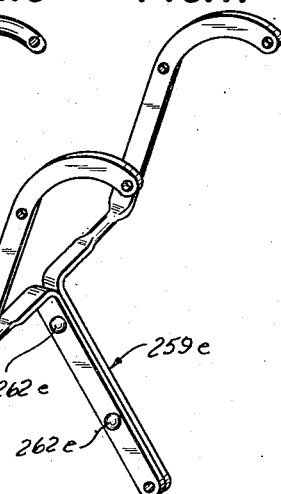
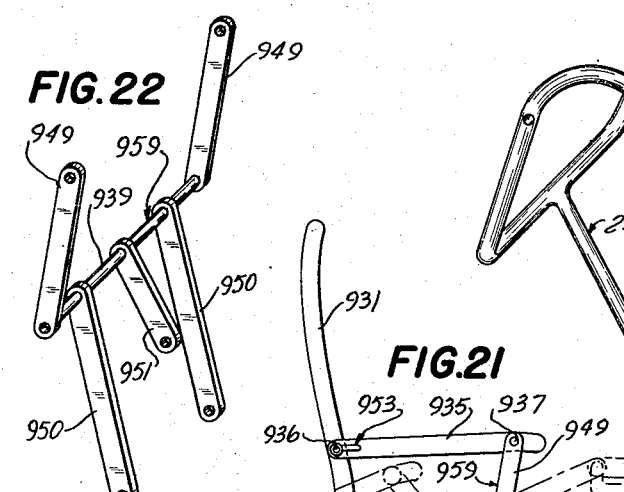
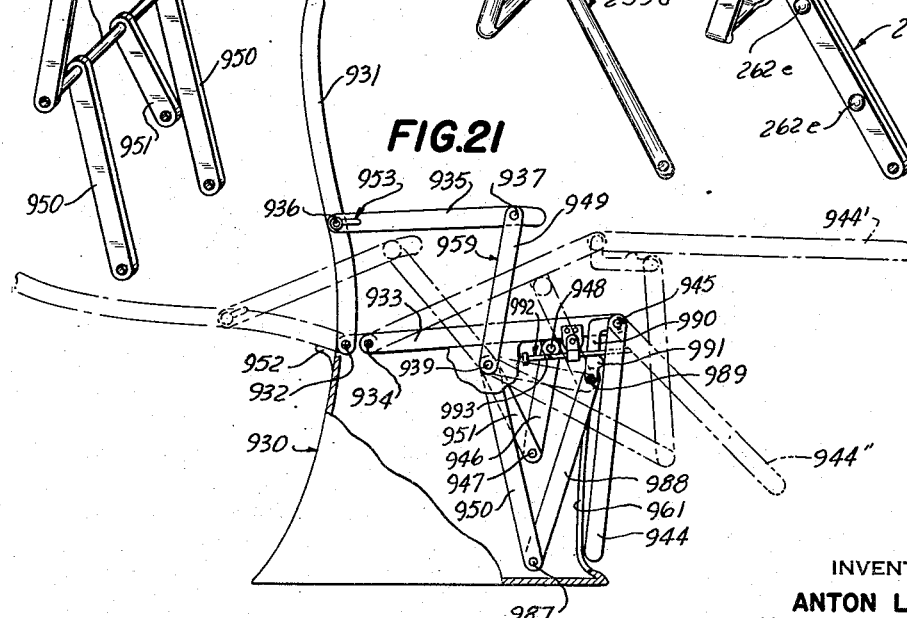
INVENTOR
ANTON LORENZ
BY
HIS ATTORNEY Dec. 1, 1953 A. LORENZ 2,661,048
RECLINING ARTICLE OF FURNITURE Filed Jan. 31, 1946 6 Sheets—Sheet 5

INVENTOR
ANTON LORENZ
BY
HIS ATTORNEY

Dec. 1, 1953   A. LORENZ   2,661,048
RECLINING ARTICLE OF FURNITURE
Filed Jan. 31, 1946   6 Sheets-Sheet 6
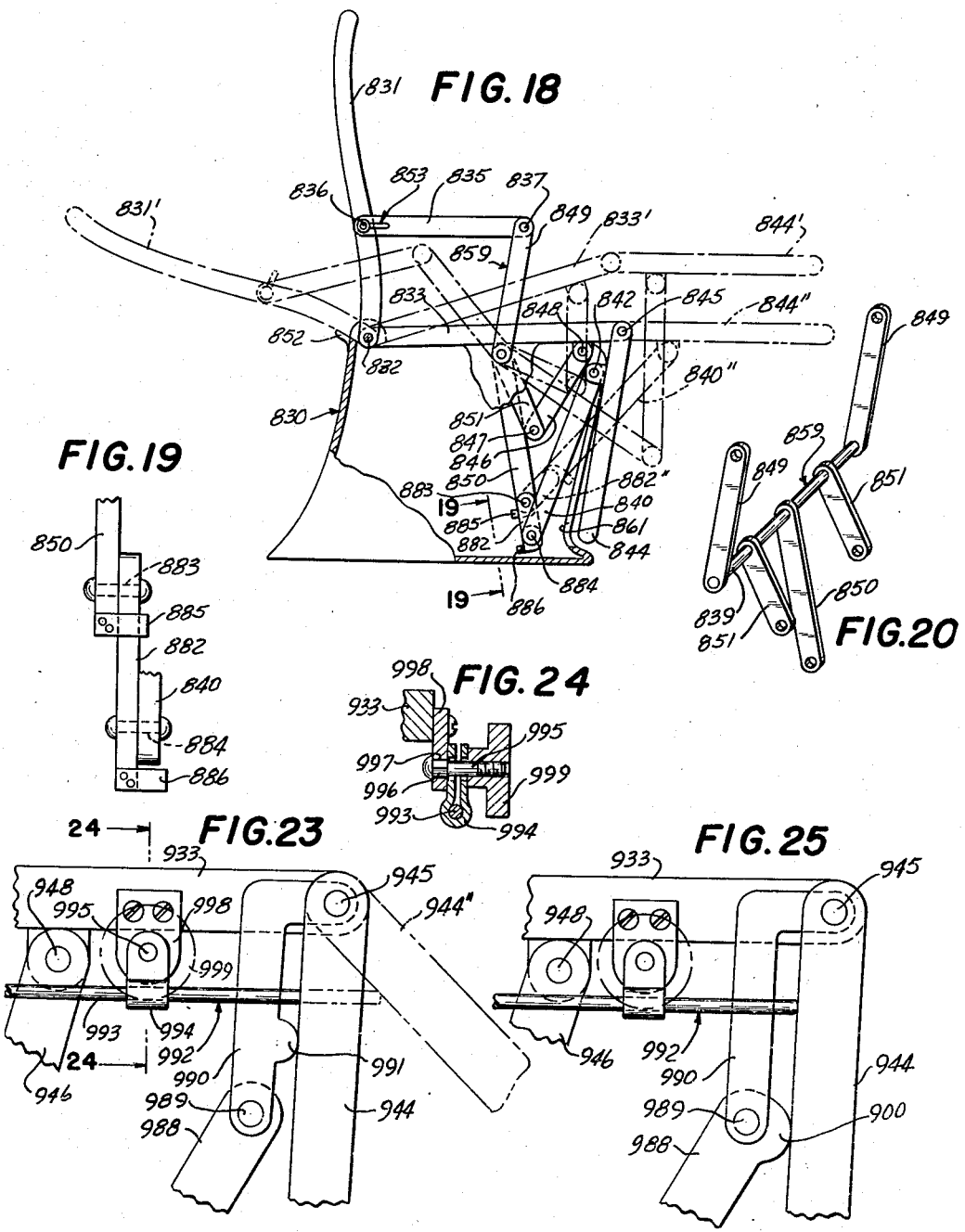
INVENTOR
ANTON LORENZ
BY 
HIS ATTORNEY Patented Dec. 1, 1953

2,661,048

UNITED STATES PATENT OFFICE 2,661,048

RECLINING ARTICLE OF FURNITURE

Anton Lorenz, Buffalo, N. Y.

Application January 31, 1946, Serial No. 644,452

25 Claims. (Cl. 155—110)

The present invention relates to articles of furniture, and more particularly to a reclining article of furniture, wherein the seat and the back-rest are swingably mounted on a support, and wherein a leg-rest is swingably mounted on the seat.

An object of the present invention is to provide an article of furniture of above described type with a mechanism, simple in construction, for controlling the movements of the seat and the leg-rest in dependence on movements of the back-rest.

Another object of the present invention is to improve on the construction of articles of furniture of above described type as now ordinarily made.

Figure 2:
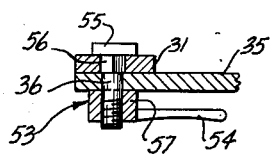
Figure 1:
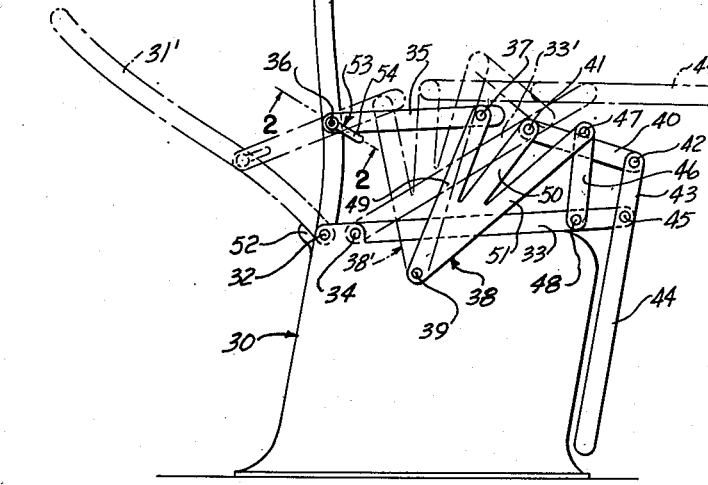
Figure 3:
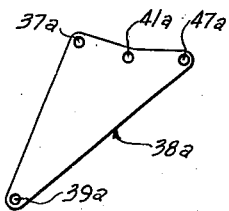
Figure 4:
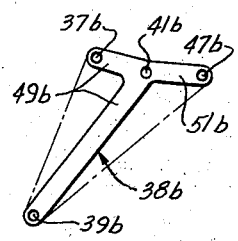
Figure 6:
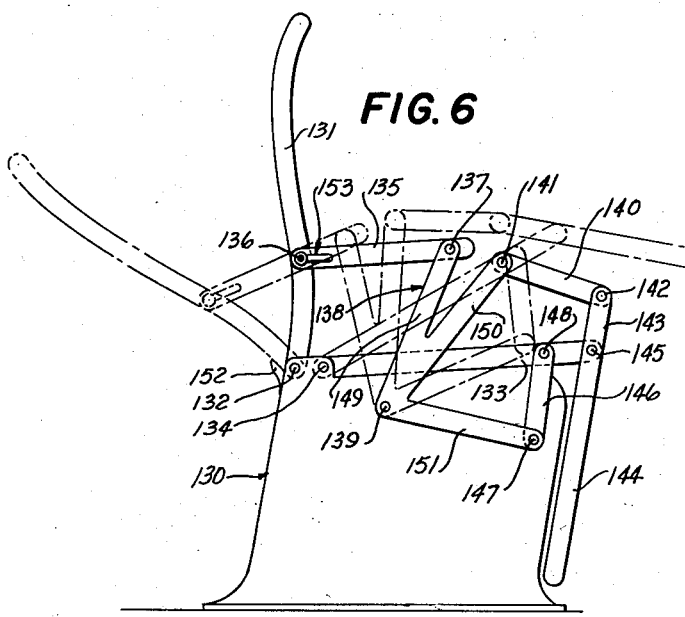
Figure 5:
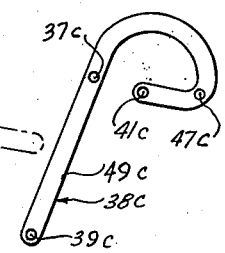
Figure 7:
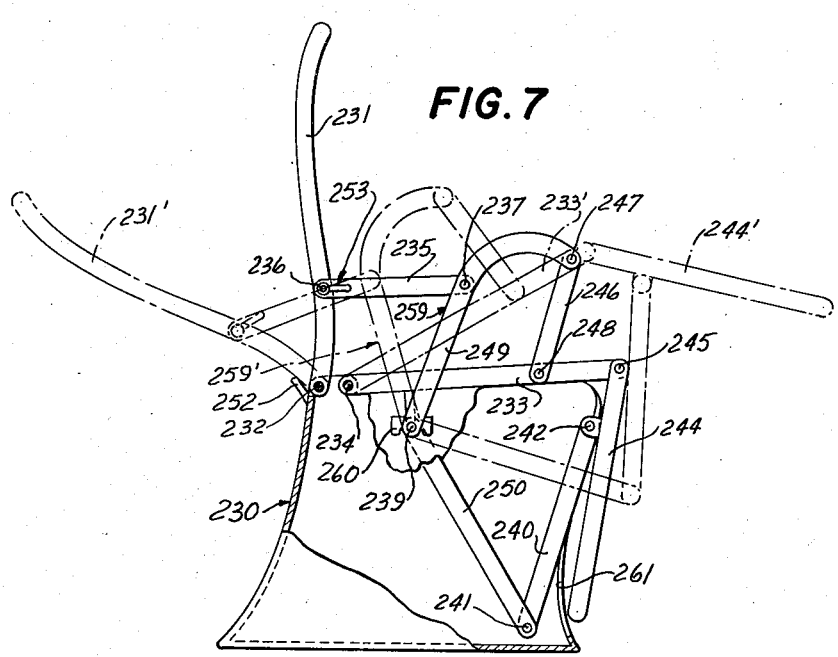
Figure 12:
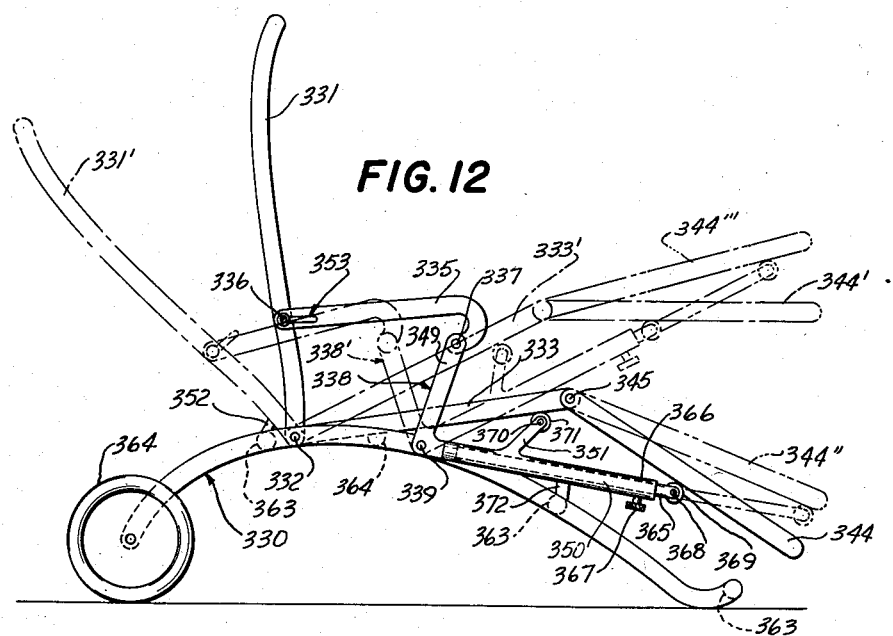
Figure 13:
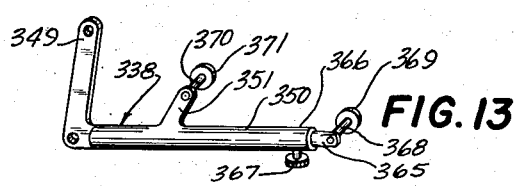
Figure 14:
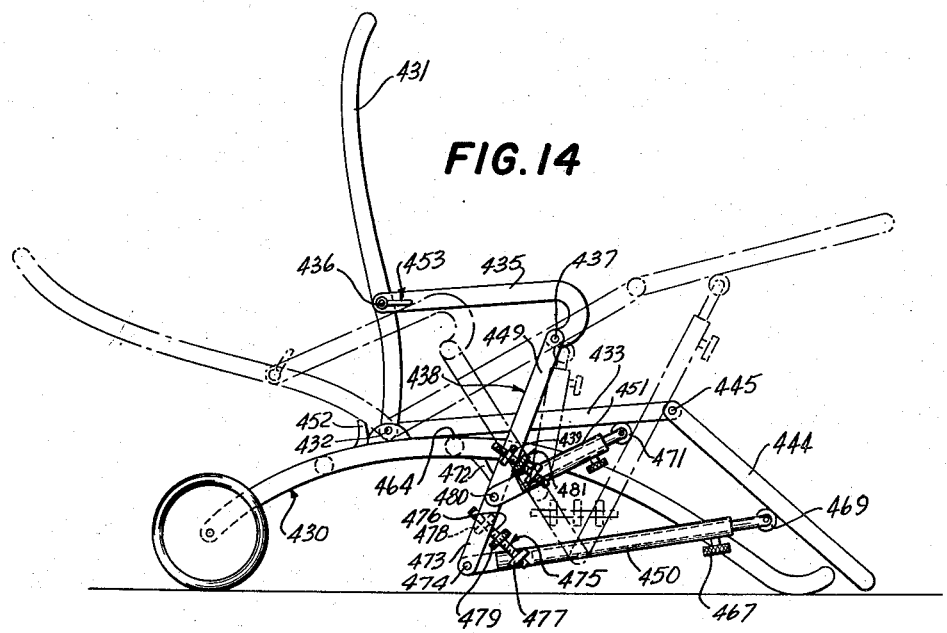
Figure 15:
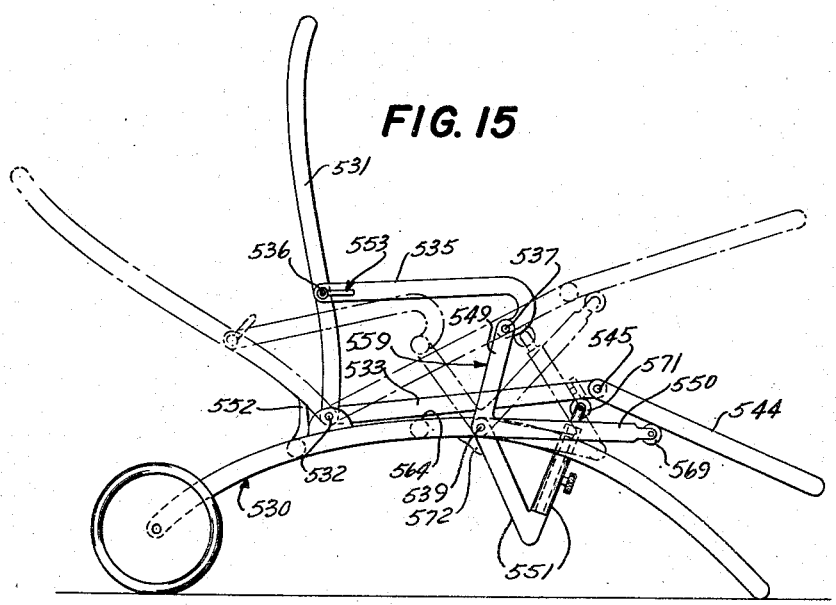
Figure 16:
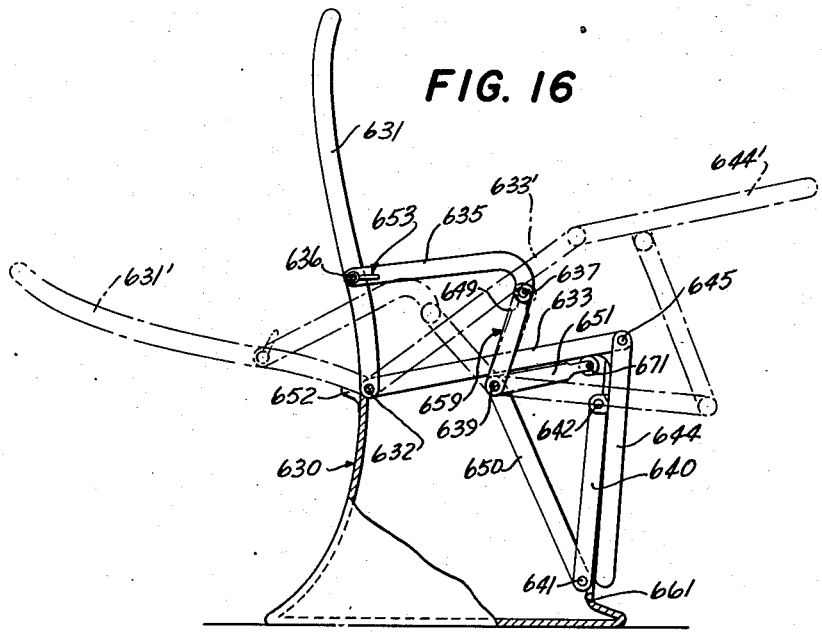
Figure 17:
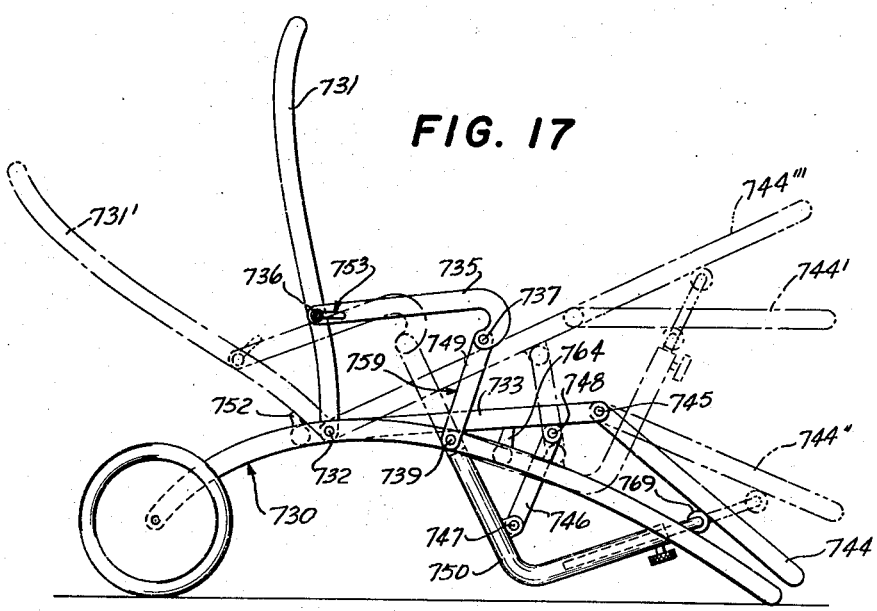

With the above and other objects of the invention in view, the invention consists in the novel construction, arrangement and combination of various devices, elements and parts, as set forth in the claims hereof, certain embodiments of the same being described in the specification and being illustrated in the accompanying drawings forming part of this specification, wherein:

Fig. 1 is a side elevational view of a reclining chair according to the invention, Fig. 2 is a sectional view of the locking device of the chair shown in Fig. 1, taken on line 2—2 of Fig. 1, Fig. 3 is an elevational view of a different embodiment of a controlling element which may be substituted for the controlling element of the chair shown in Fig. 1, Fig. 4 is an elevational view of another embodiment of a controlling element, which may be substituted for the controlling element of the chair shown in Fig. 1, Fig. 5 is an elevational view of a different embodiment of a controlling element, which may be substituted for the controlling element of the chair shown in Fig. 1, Fig. 6 is a side elevational view of a different embodiment of a reclining chair according to the invention, Fig. 7 is a side elevational view of another embodiment of a reclining chair according to the invention, a portion of the side wall of the support being broken away, Fig. 8 is a perspective view of the support of the chair shown in Fig. 7, illustrating the controlling unit of the chair mounted in the support, Fig. 9 is a fragmentary elevational view of the safety device for holding the controlling unit of the chair shown in Fig. 7 in its position, Fig. 10 is a perspective view of a different embodiment of a controlling unit which may be substituted for the controlling unit of the chair shown in Fig. 7, Fig. 11 is a perspective view of another embodiment of a controlling unit, which may be substituted for the controlling unit of the chair shown in Fig. 7, Fig. 12 is a side elevational view of a reclining chaise-longue according to the invention, Fig. 13 is a perspective view of the controlling element of the chaise-longue shown in Fig. 12, Fig. 14 is a side elevational view of a different embodiment of a reclining chaise-longue according to the invention, Fig. 15 is a side elevational view of another embodiment of a reclining chaise-longue according to the invention, Fig. 16 is a side elevational view of a reclining chair according to the invention, a portion of the side wall of the support being broken away, Fig. 17 is a side elevational view of a reclining chaise-longue according to the invention, Fig. 18 is a side elevational view of a further embodiment of a reclining chair according to the invention, a portion of the side wall of the support being broken away, Fig. 19 is a view of a detail of the chair shown in Fig. 18, taken on line 19—19 of Fig. 18, Fig. 20 is a perspective view of the controlling unit of the chair shown in Fig. 18, Fig. 21 is a side elevational view of another embodiment of a reclining chair according to the invention, a portion of the side wall being broken away, Fig. 22 is a perspective view of the controlling unit of the chair shown in Fig. 21, Fig. 23 is a fragmentary side elevational view of the front portion of the chair shown in Fig. 21 illustrating the holding device of the chair in an enlarged scale, Fig. 24 is a sectional view of the holding device shown in Fig. 23, taken on line 24—24 of Fig. 23, and Fig. 25 is an elevational view of a different embodiment of the controlling mechanism for the leg-rest, which may be used in the chair shown in Fig. 21.

Referring now to Fig. 1, 30 generally indicates a support in the shape of a casing. The lower end of a back-rest 31 is pivoted to said support 30 at 32, and the rear portion of a seat 33 is pivoted to said support 30 at 34 at a point spaced from the pivotal connection 32 between the back-rest 31 and the support 30.

On each side of the chair the rear end of a connecting link 35 is pivoted to an intermediate point of the back-rest 31 at 36. The front end of each connecting link 35 is pivoted at 37 to a controlling element generally indicated by 38. Each controlling element 38 is swingably mounted at its lower portion on the support 30 at 39. One end of a controlling bar 40 is pivoted at 41 to each controlling element 38, and the other end of each controlling bar 40 is pivoted at 42 to an upward extension 43 of a leg-rest 44 swingably mounted on the front portion of the seat 33 at 45. Furthermore, one end of a controlling rod 46 is pivoted at 47 to each controlling element 38, and the other end of each controlling rod 46 is pivoted to the front portion of the seat 33 at 48. According to the embodiment shown in Fig. 1, the controlling element generally indicated by 38 comprises a controlling link 49 integral with a controlling arm 50 and another controlling arm 51. Both controlling arms 50 and 51 extend upwardly and are pivoted at 41 and 47 respectively to the controlling bar 40 and to the controlling rod 46 respectively at a point above the plane of the seat 33.

The sitting position of above described movable members of the reclining chair shown in full lines is limited by the upper edge of the support 30 on which the seat 33 comes to a rest. When the occupant of the chair leans the weight of his body against the back-rest 31, the latter may be swung about its pivot 32 into a reclined position for example into the extreme reclined position 31' shown in dash and dot lines and limited by a stop 52 mounted on the support 30. Such a movement of the back-rest 31 into the position 31' causes a rocking movement of the controlling element 38 about its pivot 39 into the reclined position 38' through the medium of the connecting link 35, whereby both, the seat 33 and the leg-rest 44 are brought into the reclined positions 33' and 44' in dependence on the movement of the back-rest 31. When the occupant of the chair leans the weight of his body forward and/or exerts a slight pressure with his legs on the leg-rest, the movable members of the chair may be readily returned from the reclined position into the sitting position.

The movable members of the chair may be held in above described extreme reclined position or in any other intermediate reclined position by means of a locking device generally indicated by 53 and arranged on a pivot 36 connecting a connecting link 35 with the back-rest 31. As best shown in Figs. 1 and 2, said locking device 53 comprises a handle 54 screwed on the threaded end of the pivot 36. Said pivot 36 has a head 55 resting against the surface of the back-rest 31. A square portion 56 of the pivot 36 is inserted into a corresponding square aperture of the back-rest 31, whereby the pivot 36 is prevented from rotation when the handle 54 is turned. When the user of the chair loosens the locking handle 54, the surface of the hub 57 of said handle is disengaged from the surface of the connecting link 35, so that the movable members of the chair may be freely moved from one position into another one. When the locking handle 54 is tightened, the surface of the hub of the handle is pressed against the connecting link 35, whereby the latter is pressed against the back-rest 31 engaged with the head 55 of the pivot 36, so that the members of the chair are held in their position. Of course, any other type of locking device may be used instead of said locking device 53, if desired.

The controlling element 38 must not necessarily be in the shape shown in Fig. 1.

Fig. 3, for example, illustrates a different embodiment of such a controlling element, which could be used in the chair shown in Fig. 1 instead of the controlling element 38. According to Fig. 3, the controlling element 38a is in the shape of a plate having a series of bores 37a, 39a, 41a, 47a for its pivotal connections with the connecting link, the support, the controlling bar, and the controlling rod.

Fig. 4 illustrates another embodiment of a controlling element 38b, which could be used in the chair shown in Fig. 1 instead of the controlling element 38. Said controlling element 38b may be obtained, for example, by cutting recesses into a plate of the shape shown in Fig. 3; the edges of such a plate are indicated by dash lines in Fig. 4. The controlling element 38b shown in said Fig. 4 may be considered as comprising a bent controlling link 49b having bores 37b, 39b, 41b for its pivotal connections with the connecting link, the support, and the controlling bar and having a controlling arm 51b with a bore 47b for a pivotal connection with the controlling rod.

According to Fig. 5, the controlling element 38c, which may be substituted for the controlling element 38 of the chair shown in Fig. 1 comprises a single controlling link 49c of bent shape having bores 37c, 39c, 41c, and 47c for its pivotal connections with the controlling link, the support, the controlling bar, and the controlling rod.

According to the embodiment of a reclining chair shown in Fig. 6, again the back-rest 131 and the seat 133 are pivoted to the support 130 at spaced points 132 and 134. The controlling element 138 swingably mounted on the support 130 at 139 is pivoted at 137 to the front portion of the connecting link 135, the rear end of which is pivoted at 136 to the back-rest 131. According to Fig. 6, said controlling element 138 comprises the controlling link 149, the controlling arm 150, and the controlling arm 151 positively connected with each other. The controlling arm 150 extends in an upward direction and is pivoted with one end of the controlling bar 140 at 141 at a point above the plane of the seat 133. The other end of said controlling bar 140 is pivoted at 142 to the extension 143 of the leg-rest 144 swingably mounted on the seat 133 at 145. The other controlling arm 151 of said controlling element 138 extends in a downward direction and is pivoted to one end of the controlling rod 146 at 147 at a point below the plane of the seat 133. The other end of said controlling rod 146 is pivoted to the seat 133 at 148.

When the back-rest 131 is swung about its pivot 132 from the sitting position shown in full lines into the extreme reclined position shown in dash and dot lines, the movable members of the chair are likewise brought into the extreme reclined position shown in dash and dot lines by means of above described controlling mechanism. The sitting position is limited by the upper edge of the support 130, and the extreme reclined position is limited by the stop 152. The movable members of the chair may be held in any desired position by means of the locking device 153.

According to the embodiment of a reclining chair shown in Fig. 7, the back-rest 231 and the seat 233 are pivoted to the support 230 at spaced points 232 and 234. At each side of the chair the rear end of a connecting link 235 is pivoted to the back-rest at 236. The front end of each connecting link 235 is pivoted at 237 to a controlling link 249 in the shape of a bent link. Each controlling link 249 is rigidly connected at its lower end with a transverse rod 239 (see Figs. 7 and 8). Said transverse rod 239 is rotatably engaged with recesses 258 of the side walls of the support 230. Said recesses 258 are open at the top for a purpose to be described hereinafter. A single controlling arm 250 is rigidly connected with the transverse rod 239 substantially in the center of the chair. Thus, the two controlling links 249, the controlling arm 250, and the transverse rod 239 positively connected with each other form a controlling unit 259 which may be readily inserted into the open recesses 258 from above. Said controlling unit 259 may be held in its position by means of safety plates 260 attached to the side walls of the support 230 by screws (see Figs. 8 and 9). One end of a controlling bar 240 is pivoted at 241 to the controlling arm 250, and the other end of said controlling bar 240 is pivoted at 242 to the leg-rest 244 swingably mounted on the seat 233 at 245. During movements of the movable members of the chair, said controlling bar 240 and said controlling arm 250 may pass through a slot 261 in the front wall of the support 230. On each side of the chair one end of a controlling rod 246 is pivoted to a controlling link 249 at 247 and the other end of each controlling rod 246 is pivoted to the seat 233 at 248.

When the back-rest 231 is swung about its pivot 232 into the extreme reclined position 231' limited by an abutment of the back-rest against the stop 252 mounted on the support 230, the controlling unit 259 is swung by means of the connecting links 235 into the position 259', whereby the seat 233 and the leg-rest 244 are lifted into the positions 233' and 244'.

The sitting position of the movable members of the chair is limited by an abutment of the seat 233 against the upper edge of the support 230.

The movable members of the chair may be held in any desired position by means of the locking device 253.

Fig. 10 illustrates a different embodiment of a controlling unit 259d which may be substituted for the controlling unit 259 of the chair shown in Figs. 7 and 8. According to Fig. 10, the controlling unit 259d is made of an integral piece of material.

Fig. 11 illustrates a further embodiment of a controlling unit 259e which may be substituted for the controlling unit 259 of the chair shown in Figs. 7 and 8. According to Fig. 11, the controlling unit 259 consists of two members rigidly connected with each other by rivets 262e or the like.

According to the embodiment of a reclining chaise-longue shown in Fig. 12, the back-rest 331 and the seat 333 are coaxially pivoted at 332 to the support generally indicated by 330. Said support 330 comprises side frames of tubular material connected with each other by bracing members 363, 364. The support 330 may be moved along the ground by means of wheels 364 journalled in the support in any suitable manner.

On each side of the chaise-longue, the rear end of a connecting link 335 is pivoted to the back-rest 331 at 336. Furthermore, on each side of the chaise-longue a controlling element 338 is swingably mounted on the support 330 at 339. Each controlling element 338 is pivoted to the front end of a connecting link 335 at 337. According to Figs. 12 and 13, each controlling element 338 comprises a controlling link 349, a controlling arm 350 and a controlling arm 351 rigidly connected with each other. Both controlling arms 350 and 351 are arranged below the plane of the seat 333. The controlling arm 350 is in the shape of a telescopic member having the element 365 slidably arranged in the hollow element 366. The element 365 and 366 may be held in any desired position relative to each other by means of the set screw 367. A shaft 368 carrying a rotatable roller 369 is mounted on the element 365 of the telescopic controlling arm 350, and a shaft 370 carrying a rotatable roller 371 is mounted on the controlling arm 351. The circumferential surface of the roller 369 constitutes a controlling or abutting surface arranged on the controlling arm 350 for displaceable engagement with a cooperating abutting surface on the lower side of the leg-rest 344 swingably mounted on the seat 333 at 345. Likewise, the circumferential surface of the roller 371 constitutes a controlling or abutting surface arranged on the controlling arm 351 for displaceable engagement with a cooperating abutting surface of the seat 333.

The sitting position of the movable members of the chaise-longue is limited by the bracing member 364, on which the seat 333 comes to a rest. When the back-rest 331 is swung into the extreme reclined position 331' limited by an abutment of the back-rest against the stop 352, mounted on the support 330, the controlling elements 338 are swung about their pivots 339 by means of the connecting link 335 into the position 338'. During such a movement of the controlling elements 338, the roller 369 rolls along the surface of the leg-rest 344 and the roller 371 rolls along the surface of the seat 333, whereby, at the same time, the leg-rest is brought into the position 344' and the seat is brought into the position 333'. Thus, according to Fig. 12, the controlling element 338 serves again to control the movements of the seat 333 and the leg-rest 344 in dependence on the movements of the back-rest 331.

The movable members of the chaise-longue may be held in any desired position by means of the locking device 353.

As will be readily understood from above, in contrast to the embodiments shown in Figs. 1, 6 and 7, the controlling element 338 of the chaise-longue shown in Fig. 12 is not connected by rods or bars with the seat and the leg-rest; the rollers 371 and 369 are in loose engagement with the seat 333 and the leg-rest 344 respectively. Therefore, when the handle of the locking device 353 is loosened, and the user of the chair gets up from the chair by holding on to the connecting links 335 representing the armrests of the chaise-longue, the mechanism comprising the back-rest 331, the connecting link 335, and the controlling elements 338 could collapse in a forward direction. In order to prevent said mechanism from such a collapsing, a stop 372 is arranged on the support 330 for abutting engagement with the controlling arm 350 when the seat 333 is in the sitting position. Said stop preventing a collapsing of said mechanism, however, permits a rearward movement of the movable members of the chair into a reclined position.

As mentioned above, the controlling arm 350 is of the telescopic type, so that its effective length may be varied and adjusted. Said telescopic controlling arm 350 permits a ready adjustment of the angle between the leg-rest 344 and the seat 333. If, for example, the effective length of the telescopic controlling arm 350 is extended, the leg-rest may be brought into the position 344'' shown in dash and dot lines when the seat 333 is in its sitting position shown in full lines. Now, when the back-rest 331 is swung into the position 331', the seat will reach the position 333' and the leg-rest will reach the position 344'''.

Fig. 14 illustrates a further embodiment of a reclining chaise-longue according to the invention. Again, the back-rest 431 and the seat 433 are coaxially pivoted to the support 430 at 432, and again the rear end of the connecting links 435 is pivoted to an intermediate point of the back-rest 431 at 436. On each side of the chaise-longue the upper end of a controlling link 449 swingably mounted on the support 430 at 439 is pivoted to the front connecting link 435 at 437. Each controlling link 449 has a downward extension 473 integral with the main body of the controlling link. A telescopic controlling arm 450 is swingably mounted on said extension 473 of the controlling link 449 at 474. Said controlling arm 450 may be positively held in a predetermined adjusted position relative to the extension 473 of the controlling link 449 by means of an adjusting device generally indicated by 475. Said adjusting device 475 comprises a spindle 476 threaded into threaded bores of a lug 477 mounted on the controlling arm 450 and of a lug 478 mounted on the extension 473. The spindle 476 carrying an adjusting collar 479 is of the self-locking type. As will be readily understood, the angle between the controlling arm 450 and the extension 473 may be varied by a rotation of said spindle 476 of the adjusting device 475. The telescopic controlling arm 450 carries a roller 469 for engagement with the leg-rest 444 swingably mounted on the seat 433 at 445. Likewise, the telescopic controlling arm 451 carrying the roller 471 for engagement with the seat 433 is swingably mounted on the extension 473 of the controlling link 449 at 480. The circumferential surfaces of the rollers 469 and 471 constitute abutting surfaces loosely engaged with cooperating abutting surfaces on the leg-rest and seat respectively. The controlling arm 451 may be positively held in a predetermined position relative to the extension 473 of the controlling link 449 by means of an adjusting device 481 of the type of above described adjusting device 475 between the controlling arm 450 and the extension 473. As will be readily understood, the controlling arms 450 and 451 held in a predetermined position relative to the extension 473 by means of the adjusting devices 475 and 481 are moved simultaneously with the controlling link 449, when the latter is swung about its pivot 439. The controlling link 449, the extension 473 of said controlling link, and the controlling arms 450, 451 thus positively connected with each other form a controlling element generally indicated by 438.

Of course, the swingable and adjustable mounting of one of said controlling arms 450, 451 may be replaced by a rigid connection of such a controlling arm with the extension 473, if desired.

The sitting position of the movable members of the chaise-longue shown in full lines is limited by a stop 464 mounted on the support, and the extreme reclined position of the movable members of the chaise-longue is limited by the stop 452 mounted on the support 430.

When the back-rest 431 is swung about its pivot 432, the controlling element 438 controls the movements of the seat 433 and the leg-rest 444 by means of the rollers 471 and 469 rolling along said seat and leg-rest.

The angle between the leg-rest 444 and the seat 433 may be varied by an adjustment of the angle between the telescopic controlling arm 450 and the extension 473 by means of the adjusting device 475 and/or by means of an adjustment of the effective length of the telescopic controlling arm 450 by means of the set screw 467. The angle between the seat 433 and the back-rest 431 may be varied by means of an adjustment of the angle between the telescopic controlling arm 451 and the extension 473 by means of the adjusting device 481 and/or by means of an adjustment of the effective length of the controlling arm 451 by means of the set screw 481.

The movable members of the chaise-longue may be held in any desired position by means of the locking device 453.

A stop 472 mounted on the support 430 for engagement with the extension 473 of the controlling link 449 prevents a collapsing of the mechanism including the back-rest 431, the connecting links 435, and the controlling element 438 in a forward direction, when the seat 433 is held in the sitting position by the stop 464.

Fig. 15 illustrates a reclining chaise-longue according to the invention, wherein the back-rest 531, the seat 533 are coaxially pivoted to the support 530 at 532. On each side of the chaise-longue the rear end of a connecting link 535 is pivoted to the back-rest 531 at 536. The front end of each connecting link 535 is pivoted at 537 to a controlling link 549. Each controlling link 549 is rigidly connected at its lower end with a transverse rod 539 rotatably mounted in the support 530 in any suitable manner. On each side of the chaise-longue a controlling arm 550 carrying a roller 569 for engagement with the leg-rest 544 swingably mounted on the seat 533 at 545 is integral with said controlling link 549. Furthemore, a bent controlling arm 551 is rigidly connected to the transverse rod 539 substantially in the center of the chaise-longue. The telescopic end of said controlling arm 551 carries a roller 571 for loose contact with the seat 533. The controlling links 549, the controlling arms 550, the controlling arm 551, and the transverse rod 539 rigidly connected with each other form a controlling unit generally indicated by 559.

The sitting position of the movable members of the chaise-longue shown in full lines is limited by the stop 564 mounted on the support 530 for engagement with the seat, and the extreme reclined position of the movable members of the chaise-longue shown in dash and dot lines is limited by the stop 552 mounted on the support 530 for engagement with the back-rest.

A stop 572 mounted on the support 530 for engagement with the controlling arm 551 prevents a collapsing of the mechanism including the back-rest 531, the connecting links 535 and the controlling unit 559, when the seat 533 is held in its sitting position by the stop 564.

The movable members of the chair may be held in any desired position by means of the locking device 553.

According to Fig. 16, the back-rest 631 and the seat 633 of a reclining chair according to the invention are coaxially pivoted to the casing-like support 630 at 632. On each side of the chair one end of a connecting link 635 is pivoted at 636 to the back-rest 631, and the other end of the connecting link 635 is pivoted at 637 to a controlling link 649 rigidly connected with a transverse rod 639 rotatably mounted in the support 630. A controlling arm 651 rigidly connected with said transverse rod 639 carries a roller 671 for loose contact with the seat 633. The circumferential surface of said roller 671 constitutes an abutting surface abutting against a cooperating abutting surface on the seat 633. A controlling arm 650, however, also rigidly connected with said transverse rod 639 is pivotally connected at 641 with a controlling bar 640, which, in turn, is pivotally connected at 642 with the leg-rest 644 swingably mounted on the seat 633 at 645. The controlling bar 640 and the controlling arm 650 may pass through a slot 661 in the front wall of the support 630. The controlling links 649, the controlling arm 650, the controlling arm 651, and the transverse rod 639 rigidly connected with each other form a controlling unit generally indicated by 659.

The sitting position of the movable members of the chair shown in full lines is limited by the upper edge of the support 630, and the extreme reclined position of the movable members of the chair shown in dash and dot lines is limited by the stop 652.

When the back-rest 631 is swung about its pivot 632 from the sitting position into the reclined position 631', the controlling unit is likewise swung in counter-clockwise direction as viewed in Fig. 16, so that the seat 633 is lifted into the position 633' by means of the roller 671 on the controlling arm 651 and the leg-rest 644 is brought into the position 644' by means of the controlling arm 650 and the controlling bar 640.

The movable members of the chair may be held in any desired position by means of the locking device 653.

According to the embodiment of a chaise-longue shown in Fig. 17, the back-rest 731 and the seat 733 are coaxially pivoted to the support 730 at 732. On each side of the chaise-longue the rear end of a connecting link 735 is pivoted to the back-rest 731 at 736, and the front end of each connecting link 735 is pivoted at 737 to a connecting link 749. Each connecting link 749 is rigidly connected with a transverse rod 739 rotatably mounted in the support 730. A bent controlling arm 750 is also rigidly connected with said transverse rod 739, the telescopic end of said controlling arm 750 carries a roller 769 for loose contact with the leg-rest 744 swingably mounted on the seat 733 at 745. One end of a controlling rod 746 is pivoted at 747 to the controlling arm 750, and the other end of said controlling rod 746 is pivoted at 748 to the seat 733. The controlling links 749, the controlling arm 750, and the transverse rod 739 rigidly connected with each other form a controlling unit generally indicated by 759. Said controlling unit 759 controls the movements of the seat 733 and the leg-rest 744 through the medium of the controlling rod 746 and the roller 769 in dependence on the movements of the back-rest 731, to which it is connected from the medium of the connecting links 735.

The sitting position of the movable members of the chaise-longue is limited by the stop 764, and the extreme reclined position of the movable members of the chaise-longue is limited by the stop 752.

The movable members of the chair may be held in any desired position by means of the locking device 753.

When the leg-rest 744 is in the position shown in full lines, the leg-rest will reach the position 744', when the back-rest is brought into the extreme reclined position 731'. When, however, the leg-rest is adjusted in the dash and dot line position 744'' by means of the telescopic controlling arm 750, the leg-rest will reach the position 744''' when the back-rest 731 is brought into the position 731'.

According to the embodiment of a reclining chair shown in Fig. 18, the back-rest 831 and the seat 833 are coaxially pivoted to the support 830 at 832. On each side of the chair the rear end of a connecting link 835 is pivoted to said back-rest 831 at 836. The front end of each connecting link 835 is pivoted at 837 to a controlling link 849, the lower end of which is rigidly connected with a transverse rod 839 rotatably mounted in the support 830 (see Figs. 18 and 20). Furthermore, two controlling arms 851 are rigidly connected with said transverse rod 839. One end of a controlling rod 846 is pivoted to each controlling arm 851 at 847, and the other end of each controlling rod 846 is pivoted to the seat 833 at 848. Another controlling arm 850 is rigidly connected to said transverse rod 839, substantially in the center of the chair. As best shown in Figs. 18 and 19, one end of an adjusting element or bar 882 is swingably mounted on said controlling arm 850 at 883. The other end of said adjusting element 882 is pivoted at 884 to one end of the controlling bar 840, the other end of which is pivoted at 842 to the leg-rest 844 swingably mounted on the seat 833 at 845. The controlling bar 840 may pass through a slot 861 in the front wall of the support 830. A stop 885 secured to the controlling arm 850 by screws is arranged for engagement with the swingable adjusting bar 882, so as to hold same in alignment with the controlling arm 850 as shown in full lines in Fig. 18.

When the back-rest 831 is swung about its pivot 832 into the extreme reclined position 831' shown in dash and dot lines and limited by the stop 852, the controlling unit 859 connected with the back-rest 831 by the connecting links 835 and formed by the controlling links 849, the controlling arm 850, the controlling arms 851, and the transverse rod 839 rigidly connected with each other causes a movement of the seat 833 and the leg-rest 844 into the position 833' and 844' through the medium of the controlling bar 840 and controlling rods 846.

The movable members of the chair may be held in any desired position by means of the locking device 853.

As mentioned above, the adjusting bar 882 is swingable about the pivot 883. If the back-rest and seat are held in a predetermined position, for example the sitting position shown in full lines in Fig. 18, by means of the locking device 853, the leg-rest 844 may be swung by hand about its pivot 845 into the position 844'', wherein the controlling bar and the adjusting bar are in the positions 840'', 882'' in alignment with each other. Now, when a slight pressure is exerted on the leg-rest, for example by the legs of the occupant resting in the chair, the controlling bar and the adjusting bar are moved slightly beyond said straight line, until a stop 886 secured to the adjusting bar 882 by screws abuts against the controlling bar, whereby said elements are locked and held in a predetermined position relative to each other.

According to the embodiment of a reclining chair shown in Fig. 21, the back-rest 931 is pivoted to the support 930 at 932. The seat 933 is pivoted to the support 930 at 934 at a point spaced from the pivotal connection 932 between the back-rest 931 and the support 930. A connecting link 935 is pivoted to the back-rest 931 at 936 at each side of the chair. Furthermore, on each side of the chair a controlling link 949 is pivoted to the connecting link 935 at 937. The lower end of each controlling link 949 is rigidly connected with a transverse rod 939 rotatably mounted in the support 930 (see Figs. 21 and 22). A controlling arm 951 is rigidly connected with the transverse rod 939 substantially in the center of the chair. One end of a controlling rod 946 is pivoted to said controlling arm 951 at 947, the other end of said controlling rod 946 is pivoted to the seat 933 at 948. Furthermore, two controlling arms 950 are rigidly connected with said transverse rod 939. Each controlling arm 950 is pivoted at 987 with one end of a first controlling bar 988, the other end of which is pivoted at 989 to a second controlling bar 990. As best shown in Figs. 21 and 23, said second controlling bar provided with a controlling surface 991 in the shape of a cam for loose contact with the leg-rest 944 is coaxially pivoted with said leg-rest 944 to the seat 933 at 945. The leg-rest 944 may be held against said controlling surface 991 by means of a spring (not shown). When the leg-rest is in contact with said controlling cam surface 991, the movements of the leg-rest are controlled by the controlling arms 950 and the controlling bar mechanisms 988, 990 in dependence on the movements of the back-rest 931, as the controlling arms 950 are rigidly connected with the controlling links 949, which, in turn, are connected with the back-rest 931 through the connecting links 935. Again, the controlling links 949, the controlling arms 950, the controlling arm 951, and the transverse rod 939 rigidly connected with each other form a controlling unit generally indicated by 959, which serves to control the movements of the seat 933 and the leg-rest 944 in dependence on the movements of the back-rest 931. During a movement of the members of the chair the controlling arms 950 and the controlling bar mechanisms 988, 990 may pass through a slot 961 in the front wall of the support 930.

The sitting position shown in full lines is limited by the upper edge of the support 930, and the extreme reclined position shown in dash and dot lines is limited by the stop 952 of the support.

The movable members of the chair may be held in any desired position by means of the locking device 953.

If desired, the leg-rest 944 may be moved independently of the second controlling bar 990 relative to the seat 933, as the leg-rest 944 is in loose engagement with the controlling surface 991. For example, the leg-rest 944 may be brought into the position 944″, while the other members of the chair remain in the position shown in full lines. The leg-rest may be held in said position 944″ by means of a holding device generally indicated by 992. As best shown in Figs. 23 and 24, said holding device 992 comprises a rod 993 slidably arranged in a clamping sleeve 994 engaged with a bolt 995 inserted with its square portion 996 into a square aperture 997 of a lug 998 mounted on the seat 933. An adjusting knob 999 is threaded on the threaded end portion of the bolt 995 projecting from the clamping sleeve 994. When the adjusting knob 999 is loosened, the rod 993 may be displaced for engagement with the leg-rest in its elevated position 944″. Upon a tightening of the adjusting knob 999 the clamping sleeve 994 is tightened on the rod 993 for holding same and the leg-rest in its position. When the movable members of the chair are brought from the sitting position into a reclined position, the leg-rest will remain in the adjusted position relative to the seat until the controlling cam 991 of the second controlling bar 990 abuts against the leg-rest 944, whereupon the controlling cam 991 controls the movements of the leg-rest and displaces same relative to the seat.

Fig. 25 illustrates a different embodiment of a control of the leg-rest 944, which may be substituted for the leg-rest control shown in Figs. 21 and 23. According to Fig. 25, the first controlling bar 988 pivoted at 989 to the second controlling bar 990 is provided with a cam-like controlling surface 900 in loose contact with the leg-rest 944 pivoted to the seat 933 at 945 for controlling the movements of the leg-rest. Of course, the leg-rest 944 may be disengaged from said controlling surface 900 and may be held in a predetermined position relative to the seat 933 by the holding device generally indicated by 992.

It is understood, that certain parts, elements, or mechanisms shown in a certain figure may be substituted for corresponding parts, elements, or mechanisms of the embodiments shown in other figures of the drawings.

I have described preferred embodiments of my invention, but it is understood that this disclosure is for the purpose of illustration, and that various omissions or changes in shape, proportion, and arrangement of parts, as well as the substitution of equivalent elements for those herein shown and described, may be made without departing from the spirit and scope of the invention as set forth in the appended claims.

What I claim is:

1. A reclining article of furniture comprising: a support, a back-rest pivotally mounted on said support, a seat, the rear portion of said seat being swingably mounted on said support, a controlling element, said controlling element being swingably mounted on said support at a point spaced from the pivotal connection of the back-rest with the support, said controlling element having three different engaging means being arranged at fixed distances from one another and said point at which said controlling element is swingably mounted on said support so as to form a quadrilateral, a connecting link, said connecting link being pivoted at its rear end to an intermediate point of said back-rest above the pivotal connection between the back-rest and the support and being pivoted at its front portion to one of said engaging means of said controlling element, a leg-rest swingably mounted on the front portion of said seat, first means positioned between a second one of said engaging means of said controlling element and said seat and in operative engagement with each to effect movement of said seat in coordination with said controlling element, and second means positioned between the third one of said engaging means of said controlling element and said leg-rest and in operative engagement with each to effect movement of said leg-rest in coordination with said controlling element.

2. In a reclining article of furniture as claimed in claim 1, said back-rest being pivoted to said support at a point spaced from the swingable mounting of the seat on the support.

3. In a reclining article of furniture as claimed in claim 1, said back-rest and said seat being coaxially pivoted to said support.

4. In a reclining article of furniture as claimed in claim 1, said back-rest being pivoted to said support at a point spaced from the swingable mounting of the seat on the support.

5. In a reclining article of furniture as claimed in claim 1, said first means including a controlling rod pivoted at one of its ends to said controlling element, the other end of said controlling rod being pivoted to said seat, and said second means including a controlling bar pivoted at one of its ends to said controlling element, and the other end of said controlling bar being pivoted to said leg-rest.

6. In a reclining article of furniture as claimed in claim 1, said first means including a controlling rod pivoted at one of its ends to said controlling element and at its other end to said seat, and said second means including a controlling bar pivoted at one of its ends to said controlling element and at its other end to said leg-rest.

7. A reclining article of furniture comprising: a support, a back-rest pivotally mounted on said support, a seat, the rear portion of said seat being swingably mounted on said support, a controlling link, said controlling link being swingably mounted on said support at a point spaced from the pivotal connection between the back-rest and the support, said controlling link having first engaging means, a connecting link, said connecting link being pivoted at its rear end to an intermediate point of said back-rest above the pivotal connection between the back-rest and the support and being pivoted at its front portion to said first engaging means of said controlling link, a leg-rest swingably mounted on the front portion of said seat, a controlling arm, one end of said controlling arm being positively connected with said controlling link, said controlling arm having second engaging means at its other end, an extension in fixed relation to said controlling link, said extension having third engaging means, said first, second and third engaging means being arranged at fixed distances from one another and said point at which said controlling link is swingably mounted on said support so as to form a quadrilateral, first means positioned between said second engaging means of said controlling arm and said seat and in operative engagement with each to effect movement of said seat in coordination with said controlling arm, and second means positioned between said third engaging means of said extension and said leg-rest and in operative engagement with each so as to effect movement of said leg-rest in coordination with said extension.

8. A reclining article of furniture comprising: a support, a back-rest pivotally mounted on said support, a seat, the rear portion of said seat being swingably mounted on said support, a controlling link, said controlling link being swingably mounted on said support at a point spaced from the pivotal connection between the back-rest and the support, said controlling link having first engaging means, a connecting link, said connecting link being pivoted at its rear end to an intermediate point of said back-rest above the pivotal connection between the back-rest and the support and being pivoted at its front portion to said first engaging means of said controlling link, a leg-rest swingably mounted on the front portion of said seat, a first controlling arm, one end of said first controlling arm being positively connected with said controlling link, second engaging means arranged on the other end of said first controlling arm, first means positioned between said second engaging means of said first controlling arm and said seat and in operative engagement with each to effect movement of said seat in coordination with said first controlling arm, a second separate controlling arm, one end of said second controlling arm being positively connected with said controlling link, third engaging means arranged at the other end of said second controlling arm, said first, second and third engaging means being arranged at fixed distances from one another and from said point at which said controlling link is swingably mounted on said support, so as to form a quadrilateral, and second means positioned between said third engaging means of said second controlling arm and said leg-rest and in operative engagement with each to effect movement of said leg-rest in coordination with said second controlling arm.

9. In a reclining article of furniture as claimed in claim 8, said first means including a controlling rod pivoted at one of its ends to said first controlling arm, the other end of said controlling rod being pivoted to said seat, and said second means including a controlling bar pivoted at one of its ends to said second controlling arm, and the other end of said controlling bar being pivoted to said leg-rest.

10. A reclining article of furniture, comprising: a support, a back-rest pivotally mounted on said support, a seat, the rear portion of said seat being swingably mounted on said support, a controlling link, said controlling link being swingably mounted on said support at a point spaced from the pivotal connection between the back-rest and the support, a connecting link, said connecting link being pivoted at its rear end to an intermediate point of said back-rest above the pivotal connection between the back-rest and the support and being pivoted at its front portion to said controlling link, a leg-rest swingably mounted on the front portion of said seat, a first controlling arm, one end of said first controlling arm being positively connected with said controlling link, means positioned between said first controlling arm and said seat and in operative engagement with each to effect movement of said seat in coordination with said first controlling arm, a second controlling arm, one end of said second controlling arm being positively connected with said controlling link, an adjusting element swingably mounted on said second controlling arm, means whereby said adjusting element may be held in a predetermined position relative to said second controlling arm, and a controlling bar pivotally connected at one of its ends with said adjusting element, and the other end of said controlling bar being pivotally connected with said leg-rest.

11. In a reclining article of furniture as claimed in claim 10, said means positioned between the first controlling arm and the seat including a controlling rod pivoted at one of its ends to said first controlling arm and at its other end to said seat.

12. A reclining article of furniture, comprising: a support, a back-rest pivotally mounted on said support, a seat, the rear portion of said seat being swingably mounted on said support, a controlling element, said controlling element being swingably mounted on said support at a point spaced from the pivotal connection between the back-rest and the support, said controlling element having first engaging means, a connecting link, said connecting link being pivoted at its rear end to an intermediate point of said back-rest above the pivotal connection between the back-rest and the support and being pivoted at its front portion to said first engaging means of said controlling element, a leg-rest swingably mounted on the front portion of said seat, cooperating abutting surfaces on said controlling element and said seat movably engaged with each other to effect movement of said seat in coordination with said controlling element, said abutting surface on said controlling element forming second engaging means, said controlling element having third engaging means, and means positioned between said third engaging means of said controlling element and said leg-rest to effect movement of said leg-rest in coordination with said controlling element, said first, second and third engaging means being arranged at fixed distances from one another and said point spaced from the pivotal connection between the back-rest and the support, so as to form a quadrilateral.

13. In a reclining article of furniture as claimed in claim 12, said last named means including additional cooperating abutting surfaces on said controlling element and said leg-rest movably engaged with each other so as to effect the movement of the leg-rest in coordination with said controlling element.

14. In a reclining article of furniture as claimed in claim 12, said cooperating abutting surfaces including a roller arranged on said controlling element and movably engaged with said seat.

15. In a reclining article of furniture as claimed in claim 12, said cooperating abutting surfaces including a roller arranged on said controlling element and movably engaged with said seat, said last named means including an additional roller arranged on said controlling element and movably engaged with said leg-rest.

16. In a reclining article of furniture as claimed in claim 12, said last named means including a controlling bar pivoted at one of its ends to said controlling member and at its other end to said leg-rest.

17. A reclining article of furniture, comprising: a support, a back-rest pivotally mounted on said support, a seat, the rear portion of said seat being swingably mounted on said support, a controlling element, said controlling element being swingably mounted on said support at a point spaced from the pivotal connection between the back-rest and the support, said controlling element having first engaging means and second engaging means, a connecting link, said connecting link being pivoted at its rear end to an intermediate point of said back-rest above the pivotal connection between the back-rest and the support and being pivoted at its front portion to said first engaging means of said controlling element, a leg-rest swingably mounted on the front portion of said seat, means positioned between said second engaging means of the controlling element and said seat to effect movement of said seat in coordination with said controlling element, and cooperating abutting surfaces on said controlling element and said leg-rest movably engaged with each other so as to effect the movement of the leg-rest in coordination with said controlling element, said abutting surface on said controlling element forming third engaging means, and said first, second and third engaging means being arranged at fixed distances from one another and said point spaced from the pivotal connection between the back-rest and the support so as to form a quadrilateral.

18. In a reclining article of furniture as claimed in claim 17, said cooperating abutting surfaces including a roller arranged on said controlling element and movably engaged with said leg-rest.

19. In a reclining article of furniture as as claimed in claim 17, said means positioned between the controlling element and the seat including a controlling rod pivoted at one of its ends to said controlling element and at its other end to said seat.

20. A reclining article of furniture, comprising: a support, a back-rest pivotally mounted on said support, a seat, the rear portion of said seat being swingably mounted on said support, a controlling element, said controlling element being swingably mounted on said support at a point spaced from the pivotal connection between the back-rest and the support, said controlling element having a first pivot and a second pivot, a connecting link, said connecting link being pivoted at its rear end to an intermediate point of said back-rest above the pivotal connection between the back-rest and the support and being pivoted at its front portion to said first pivot of said controlling element, a leg-rest swingably mounted on the front portion of said seat, said controlling element having engaging means, means positioned between said engaging means of the controlling element and said seat to effect movement of said seat in coordination with said controlling element, a pair of pivotally connected first and second controlling bars, the lower end portion of said first controlling bar being pivoted to said second pivot of the controlling element, the upper end portion of said second controlling bar being pivoted to said seat, and cooperating abutting surfaces on one of said controlling bars and said leg-rest to effect movement of said leg-rest in coordination with said controlling element, said first and second pivots and said engaging means of the controlling element being arranged at fixed distances from one another and said point spaced from the pivotal connection between the back-rest and the support so as to form a quadrilateral.

21. In a reclining article of furniture as claimed in claim 20, the abutting surface of the leg-rest being disengageable from the associated abutting surface of the controlling bar for independent movements of the leg-rest relative to the seat.

22. In a reclining article of furniture as claimed in claim 20, the abutting surface of the leg-rest being disengageable from the associated abutting surface of the controlling bar for independent movements of the leg-rest relative to the seat, and a holding device associated with said seat for cooperation with said leg-rest so as to hold the latter in a predetermined position relative to the seat during a disengagement of its abutting surface from the abutting surface of the controlling bar.

23. In a reclining article of furniture as claimed in claim 20, said abutting surfaces being arranged on said first controlling bar and said leg-rest.

24. In a reclining article of furniture as claimed in claim 20, said abutting surfaces being arranged on said second controlling bar and said leg-rest.

25. In a reclining article of furniture as claimed in claim 20, the pivotal connections of the second controlling bar and of the leg-rest with the seat being in coaxial alignment with each other.

ANTON LORENZ.

References Cited in the file of this patent

UNITED STATES PATENTS

| Number | Name | Date |
|---|---|---|
| 2,433,520 | Lorenz | Dec. 20, 1947 |
| 2,576,465 | Lorenz | Nov. 18, 1951 |
| 2,578,708 | Lorenz | Dec. 18, 1951 |
| 2,579,502 | Lorenz | Dec. 25, 1951 |

FOREIGN PATENTS

| Number | Country | Date |
|---|---|---|
| 19,394 | Sweden | Sept. 24, 1904 |
| 39,393 | Germany | June 9, 1887 |
| 96,456 | Sweden | June 8, 1939 |
| 373,171 | Italy | July 20, 1939 |
| 447,327 | Great Britain | May 13, 1936 |